US011339874B2

(12) United States Patent
Pregnolato et al.

(10) Patent No.: US 11,339,874 B2
(45) Date of Patent: May 24, 2022

(54) SYSTEM FOR OPERATION OF A GEARBOX FOR A MOTOR VEHICLE

(71) Applicant: FCA Italy S.p.A., Turin (IT)

(72) Inventors: Gianluigi Pregnolato, Turin (IT); Marco Consani, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 16/950,340

(22) Filed: Nov. 17, 2020

(65) Prior Publication Data

US 2021/0148462 A1 May 20, 2021

(30) Foreign Application Priority Data

Nov. 20, 2019 (EP) ..................... 19210398

(51) Int. Cl.
*F16H 63/30* (2006.01)
*F16H 19/04* (2006.01)

(52) U.S. Cl.
CPC ........... *F16H 63/304* (2013.01); *F16H 19/04* (2013.01); *F16H 2063/3059* (2013.01)

(58) Field of Classification Search
CPC ........... F16H 2063/3059; F16H 63/206; F16H 63/304
See application file for complete search history.

(56) References Cited

U.S. PATENT DOCUMENTS

| | | | | |
|---|---|---|---|---|
| 4,619,151 A * | 10/1986 | Trachman | ............. | F16H 63/304 185/40 R |
| 4,745,822 A * | 5/1988 | Trachman | ............. | F16H 63/304 74/335 |
| 5,167,164 A * | 12/1992 | Maekawa | ............. | B60K 23/08 74/422 |
| 5,832,777 A * | 11/1998 | Weilant | ............. | F16H 63/24 74/335 |
| 6,336,372 B1 * | 1/2002 | Ogami | ............. | F16H 61/32 74/335 |
| 6,481,304 B1 * | 11/2002 | Yoshioka | ............. | F16H 61/32 74/335 |

(Continued)

FOREIGN PATENT DOCUMENTS

CN 206054716 U 3/2017
DE 102016205881 A1 10/2016

OTHER PUBLICATIONS

European Search Report dated Mar. 31, 2020. 7 pages.

*Primary Examiner* — William Kelleher
*Assistant Examiner* — Gregory T Prather
(74) *Attorney, Agent, or Firm* — RMCK Law Group PLC

(57) ABSTRACT

Described herein is a system for operating a gearbox that includes: a first shaft having a first longitudinal axis; a first actuator assembly operatively connected to the first shaft; a second shaft having a second longitudinal axis; a second actuator assembly operatively connected to the second shaft; and a plurality of engagement elements connected in rotation to the second shaft. The first shaft is hollow, is fitted on the second shaft, and is axially movable relative to the second shaft. The plurality of engagement elements are moreover connected in translation to the first shaft and are axially movable therewith along the first longitudinal axis and relative to the second shaft. The first and second shafts can be operated independently of one another for execution of the movements of selection and engagement of the gears of the gearbox.

12 Claims, 5 Drawing Sheets

(56) References Cited

U.S. PATENT DOCUMENTS

| | | | |
|---|---|---|---|
| 6,588,294 B1 | 7/2003 | Rogg | |
| 2006/0011001 A1* | 1/2006 | Showalter | F16D 28/00 |
| | | | 74/23 |
| 2006/0021458 A1* | 2/2006 | Kobayashi | F16H 63/304 |
| | | | 74/473.12 |
| 2008/0210034 A1 | 9/2008 | Murakami et al. | |
| 2009/0049940 A1* | 2/2009 | Takaira | F16H 63/304 |
| | | | 74/395 |
| 2011/0061487 A1* | 3/2011 | Tooman | F16H 63/3023 |
| | | | 74/473.36 |
| 2011/0138959 A1* | 6/2011 | Wild | F16H 61/32 |
| | | | 74/473.36 |
| 2015/0075308 A1* | 3/2015 | Enami | F16H 61/28 |
| | | | 74/335 |
| 2016/0084377 A1* | 3/2016 | Ichikawa | F16H 63/20 |
| | | | 74/473.33 |
| 2018/0163821 A1* | 6/2018 | Kwon | F16H 61/688 |
| 2019/0368605 A1* | 12/2019 | Masak | F16H 63/206 |
| 2020/0116258 A1* | 4/2020 | Cyren | F16H 61/32 |
| 2020/0256400 A1* | 8/2020 | Yanagida | F16H 63/502 |

\* cited by examiner

SYSTEM FOR OPERATION OF A GEARBOX FOR A MOTOR VEHICLE

CROSS-REFERENCE TO RELATED APPLICATION

This application claims priority to European Patent Application No. 19210398.4 filed Nov. 20, 2019. The disclosure of the above application is incorporated herein by reference in its entirety.

FIELD OF THE INVENTION

The present invention relates to systems for operating gearboxes, in particular systems for operating automatic gearboxes that carry out selection and engagement of the gears.

PRIOR ART AND GENERAL TECHNICAL PROBLEM

Current control solutions for operating gearboxes with movement of an X-Y type, i.e., ones in which the operating system effects the movements of selection and engagement along the same co-ordinates of movement as those that characterize the movements in a completely manual operating system, are distinguished by the presence of a kinematic chain that is very cumbersome, and in particular such as to render installation thereof in three-axis gearboxes (for example, double-clutch gearboxes with two secondary shafts) very problematical.

Furthermore, the presence of linear or rotary actuators coupled to the case of the operating system or of the gearbox renders extremely problematical, if not altogether impossible, hybridization of the transmission via addition of an electrical machine that engages the primary shaft.

OBJECT OF THE INVENTION

The object of the present invention is to provide a system for operating a gearbox having a movement of an X-Y type that will be extremely compact and easy to install, and will enable installation of further accessories on the transmission, such as an electrical machine for mild hybridization of the vehicle.

SUMMARY OF THE INVENTION

The object of the present invention is achieved by an operating system and by a gearbox having the characteristics forming the subject of the ensuing claims, which constitute an integral part of the technical teaching provided herein in relation to the invention.

BRIEF DESCRIPTION OF THE DRAWINGS

The invention will now be described with reference to the annexed drawings, which are provided purely by way of non-limiting example and in which.

DETAILED DESCRIPTION

Figure 1:
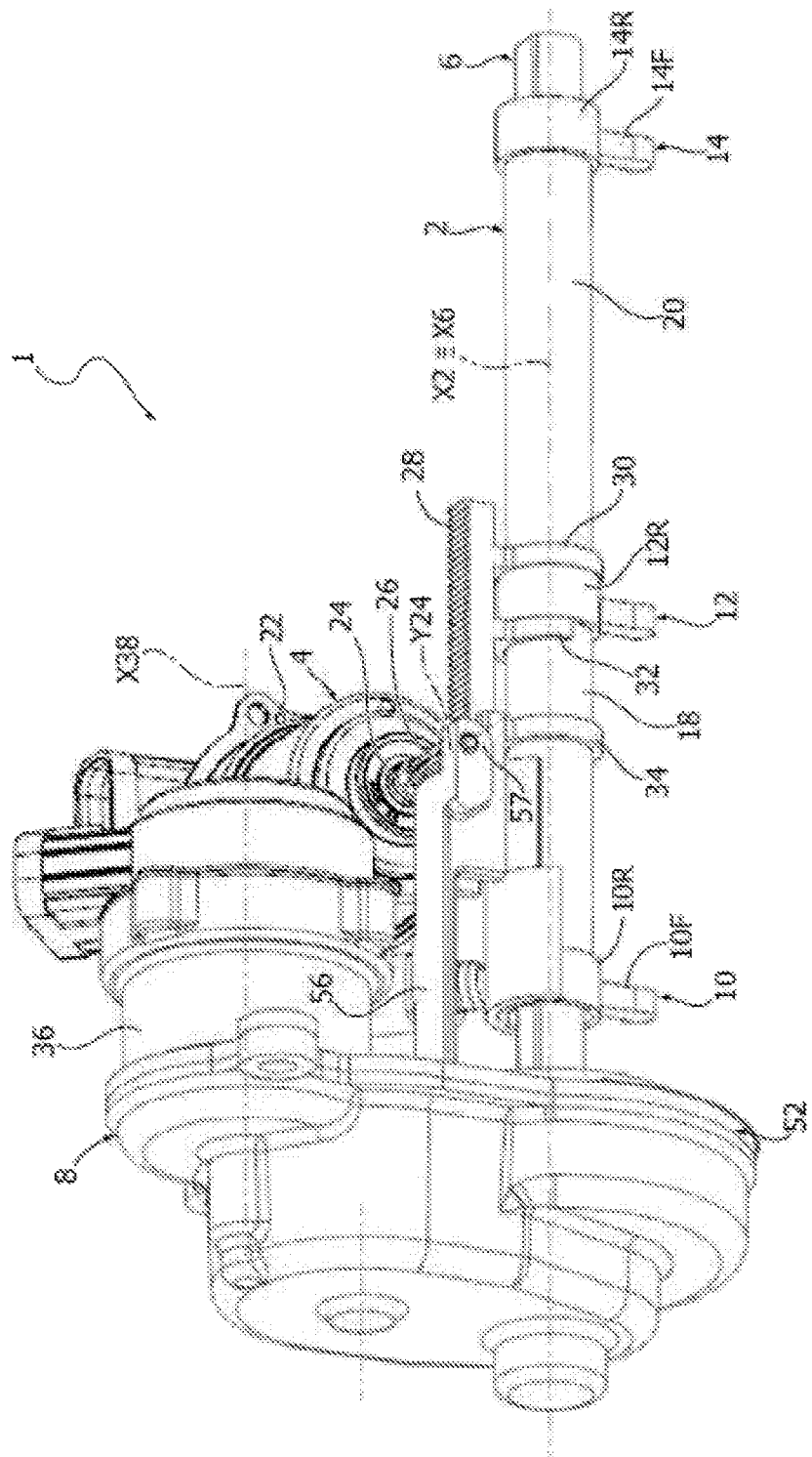
FIG. 1 is a perspective view of an operating system according to the invention.
Figure 2:
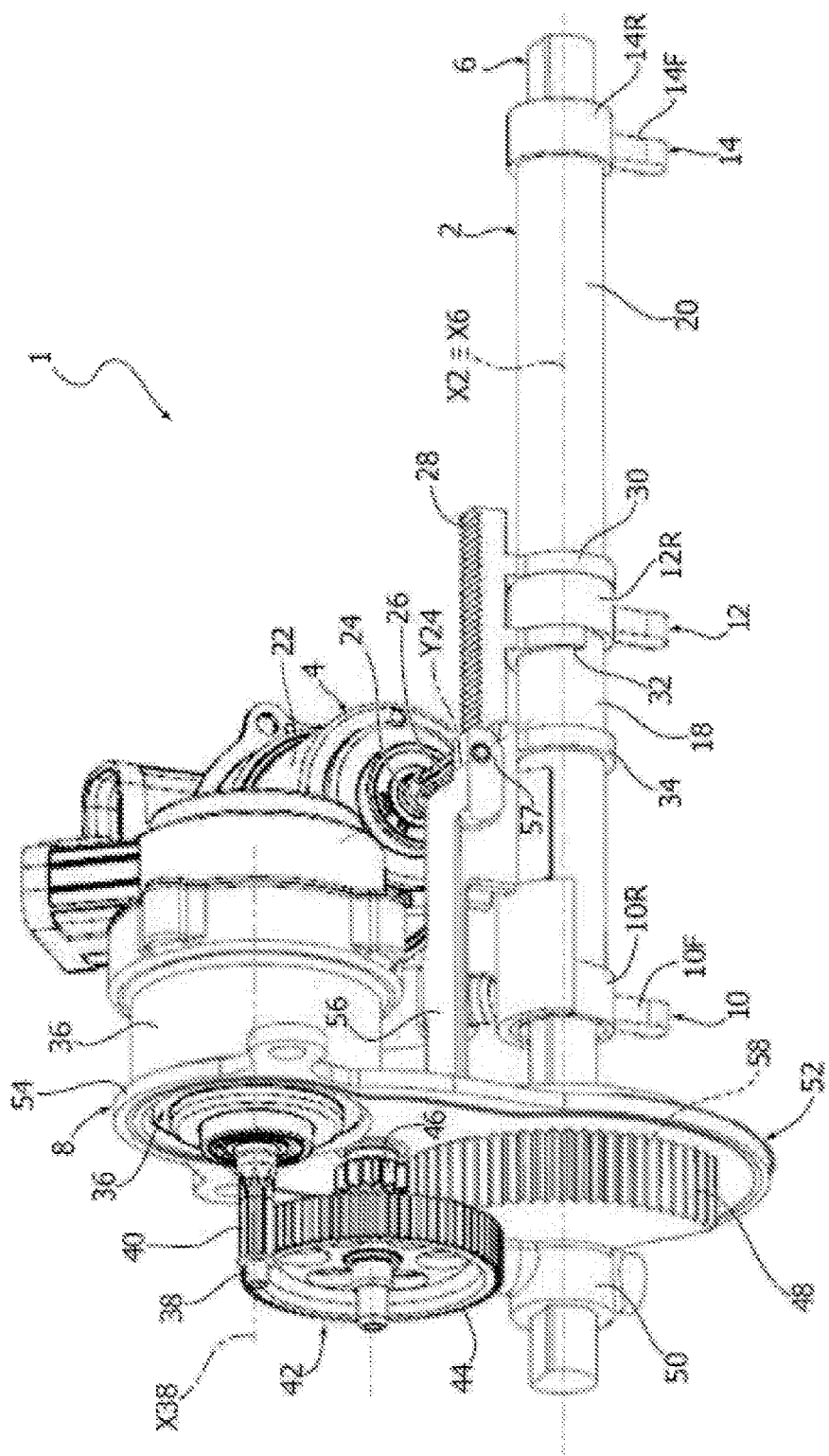
FIG. 2 is similar to FIG. 1, but some of the components have been removed for reasons of clarity.
Figure 3:
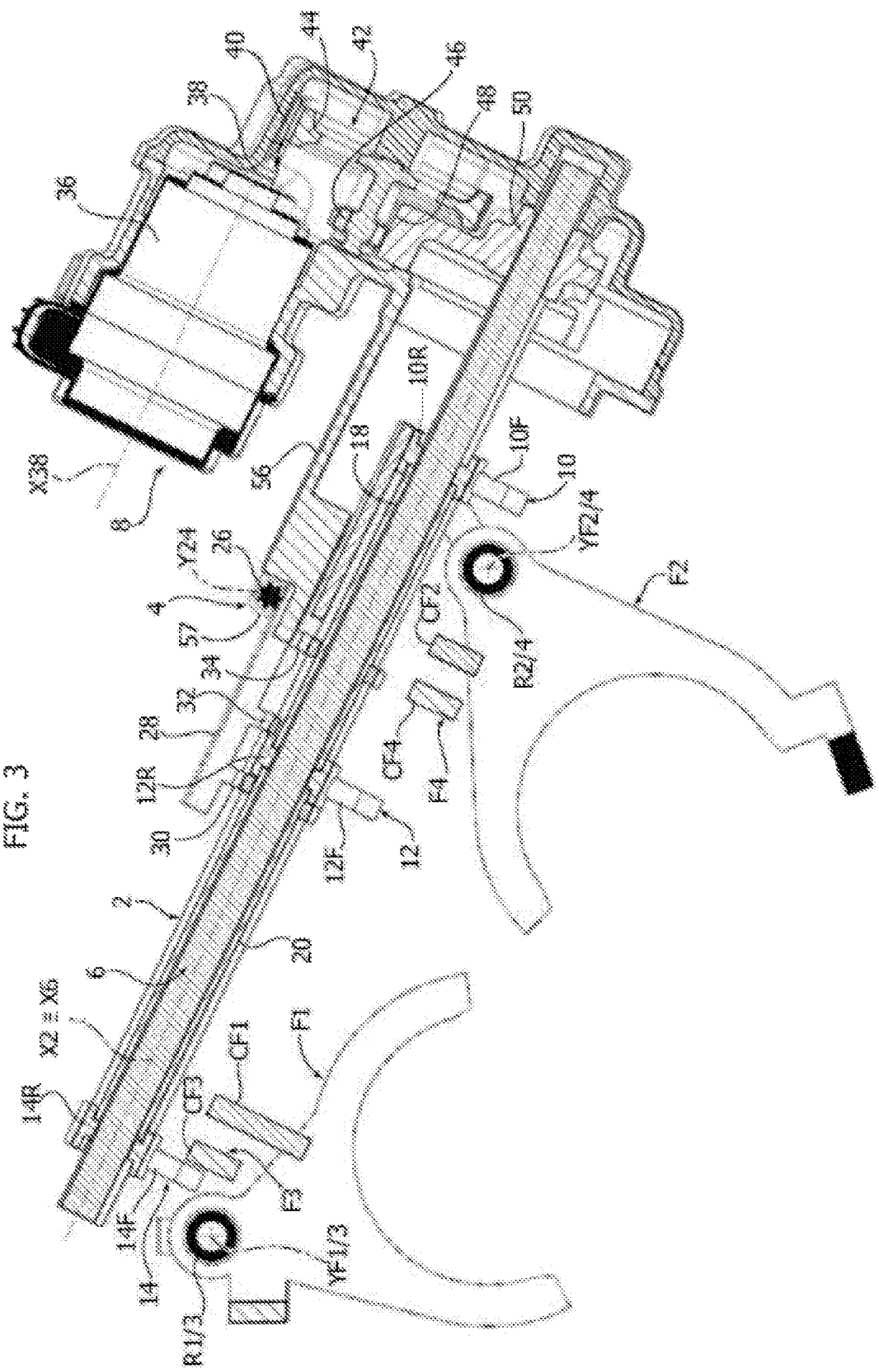
FIG. 3 is a longitudinal-sectional view of the operating system according to the invention.

With reference to FIGS. 1 to 3, number 1 designates as a whole a system for operating a gearbox according to the invention. The operating system 1 is configured for selection and engagement of the forward gears and reverse gear of the gearbox and can be optionally configured—as will be described hereinafter —for control of a mechanism for blocking the transmission that implements the parking position of the gearbox itself.

The system 1 comprises a first shaft 2, or outer shaft, having a first longitudinal axis X2, and a first actuator assembly 4, operatively connected to the first shaft 2. The system 1 further comprises a second shaft 6, or inner shaft, having a second longitudinal axis X6, and a second actuator assembly 8, operatively connected to the shaft 6. The operating system 1 further comprises a plurality of engagement elements 10, 12, 14, which are connected in rotation to the second shaft 6 and are configured for engaging with the driving elements of the gearbox.

The first shaft 2 is a hollow shaft and is fitted on the second shaft 6, preferably in such a way that the respective axes X2 and X6 coincide with one another.

The inner shaft 6 is moreover preferentially shaped with a section that is not completely circular (for example, shaped like a D) so as to be configured for shape coupling with the engagement elements 10, 12, 14.

In the preferred embodiment illustrated in the figures, each element 10, 12, 14 is provided as a bushing element comprising a collar 10R, 12R, 14R that has a central hole having a shape identical to the cross section of the shaft 6 (here shaped like a D) so as to be torsionally connected by shape fit, and a radial engagement finger 10F, 12F, 14F provided integrally with the collar itself. The shape fit between the engagement elements 10, 12, 14 is axially slidable.

With reference in particular to FIG. 3, the above solution results in the outer shaft 2 being provided with a structure formed by segments. In particular, the outer shaft 2 comprises in this embodiment a first segment 18 and a second segment 20—both provided as tubular elements—which are coupled to the engagement elements 10, 12, 14, and in particular are joined together by means of the engagement element 12. Coupling is preferably provided by interference fit between the collar 10R, 12R, 14R and the corresponding segment 18, 20.

The structures of the actuator assemblies 4, 8 and the modalities whereby they impart motion on the shafts 2, 6 will now be described in detail. With reference to FIGS. 2 and 3, the first actuator assembly 4 comprises a first rotary actuator 22 having an output shaft 24 rotatable about an axis of rotation Y24 orthogonal to the axes X2, X6. Fitted on, or provided integrally with, or otherwise connected in rotation to, the output shaft 24 is a pinion 26 that meshes with a rack 28, which in this way is axially movable in a direction parallel to the axes X2, X6.

The rack 28 is connected in axial translation along the axes X2, X6 to the shaft 2 (i.e., it translates with the shaft 2), and is in particular coupled thereto by means of a first shoulder ring 30 and a second shoulder ring 32, which are provided integrally with the rack 28 and bear upon the engagement element 12. The shoulder rings are mounted with play with respect to the segments 18, 20 of the shaft 2 in such a way that the latter can be freely rotate with respect thereto (and be supported thereby).

Optionally, a third ring 34 is provided, having the function of further rotational support for the shaft 2. Hence, the shaft 2 translates fixedly with respect to the rack 28 along the axes X2, X6, but is free to turn about the axes themselves with respect to the rack 28 itself, in particular with respect to the rings 30, 32, 34.

The second actuator assembly 8 in turn comprises a second rotary actuator 36 having an output shaft 38 rotatable about an axis X38 orthogonal to the axis Y24 parallel to the axes X2, X6. Fitted on the output shaft 38, being provided integrally therewith or otherwise connected in rotation thereto, is a pinion 40 that provides an input element of a transmission, in particular a gear-train transmission that transfers the motion from the actuator 36 to the shaft 6. The pinion 40 meshes with a first gear wheel 42, in particular with a first toothing 44 thereof having a first diameter. The toothing 44 can develop either along an arc that does not cover the entire circumference about the respective axis of rotation X42, on account of the limited angular range that it covers during operation, or along the entire circumference. A second toothing 46 of the gear wheel 42, coaxial with respect to the toothing 44, in turn meshes with a toothed sector 48 that defines an output element of the transmission in question. The toothed sector 48 is connected in rotation to the shaft 6 by means of a hub 50, which has a coupling hole with the same cross section as the shaft 6 and hence provides a shape fit therewith.

According to an advantageous aspect of the invention, the second actuator assembly 8 is carried by a mounting flange 52, which includes a seat 54 for housing the rotary actuator 36, and an extension 56 integral with the flange 52 itself. The extension 56 carries a bushing 57, which functions itself as rotation support for the output shaft 24 of the actuator assembly 4. The mounting flange 52 further comprises an annular extension 58 that fits around the shaft 6 and is able to accommodate the axial travel of the outer shaft 2.

In the various possible embodiments of the invention, the rotary actuators 22 and 36 are preferentially provided as rotary electric motors.

Figure 4:
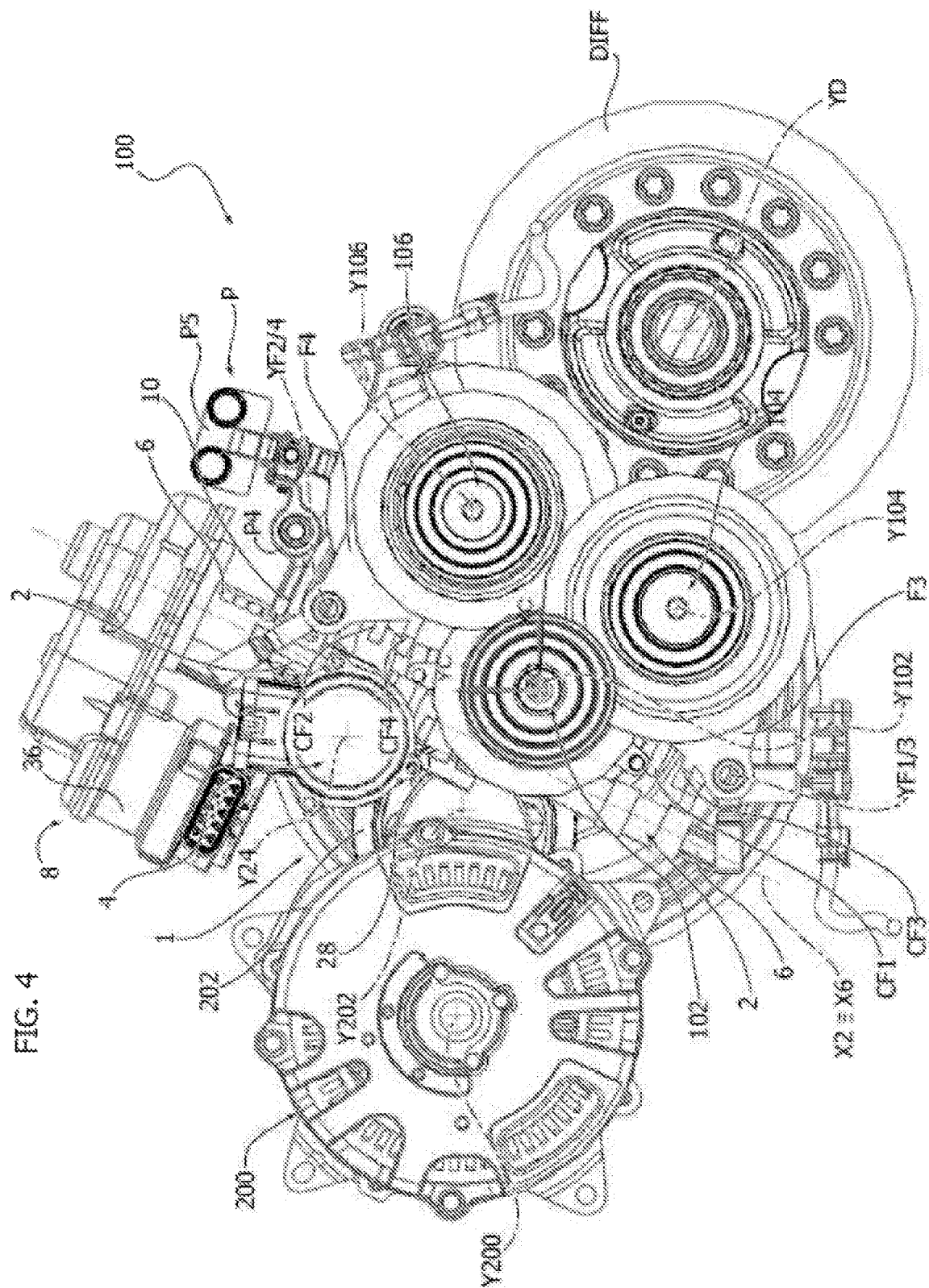
FIG. 4 is an overall view, with some components removed, of a gearbox according to the invention.

With reference to FIG. 4, number 100 designates as a whole a gearbox according to the invention. The gearbox 100 may be in itself of a known type, but in any case incorporates—according to the invention—the operating system 1. The gearbox 100 comprises a primary shaft 102, which is rotatable about an axis Y102 and carries a plurality of gear wheels rigidly connected in rotation thereto, and further includes a first secondary shaft 104 and a second secondary shaft 106, which are rotatable about axes Y104, Y106, respectively, parallel to one another and parallel to the axis Y102. Each of the secondary shafts 104, 106 carries a respective plurality of idle gear wheels, which mesh (at least) with a corresponding gear wheel on the primary shaft 102 to define the forward gears and a reverse gear of the gearbox.

Each of the two secondary shafts 104, 106 moreover bears an output pinion that meshes with a ring gear of a differential DIFF, which is rotatable about an axis YD. The idle gears on the secondary shafts 104, 106 can be selectively connected in rotation to the respective secondary shaft by means of engagement devices in themselves known (for example, synchronizers) controlled by fork driving elements F1, F2, F3, F4 visible in FIGS. 3 and 5 (in what follows, for brevity, these elements are designated as "fork/forks"). Each of the forks F1-F4 has a respective control seat CF1, CF2, CF3, CF4, which can be engaged selectively (and accordingly) by the engagement elements 10, 12, 14.

Figure 5:
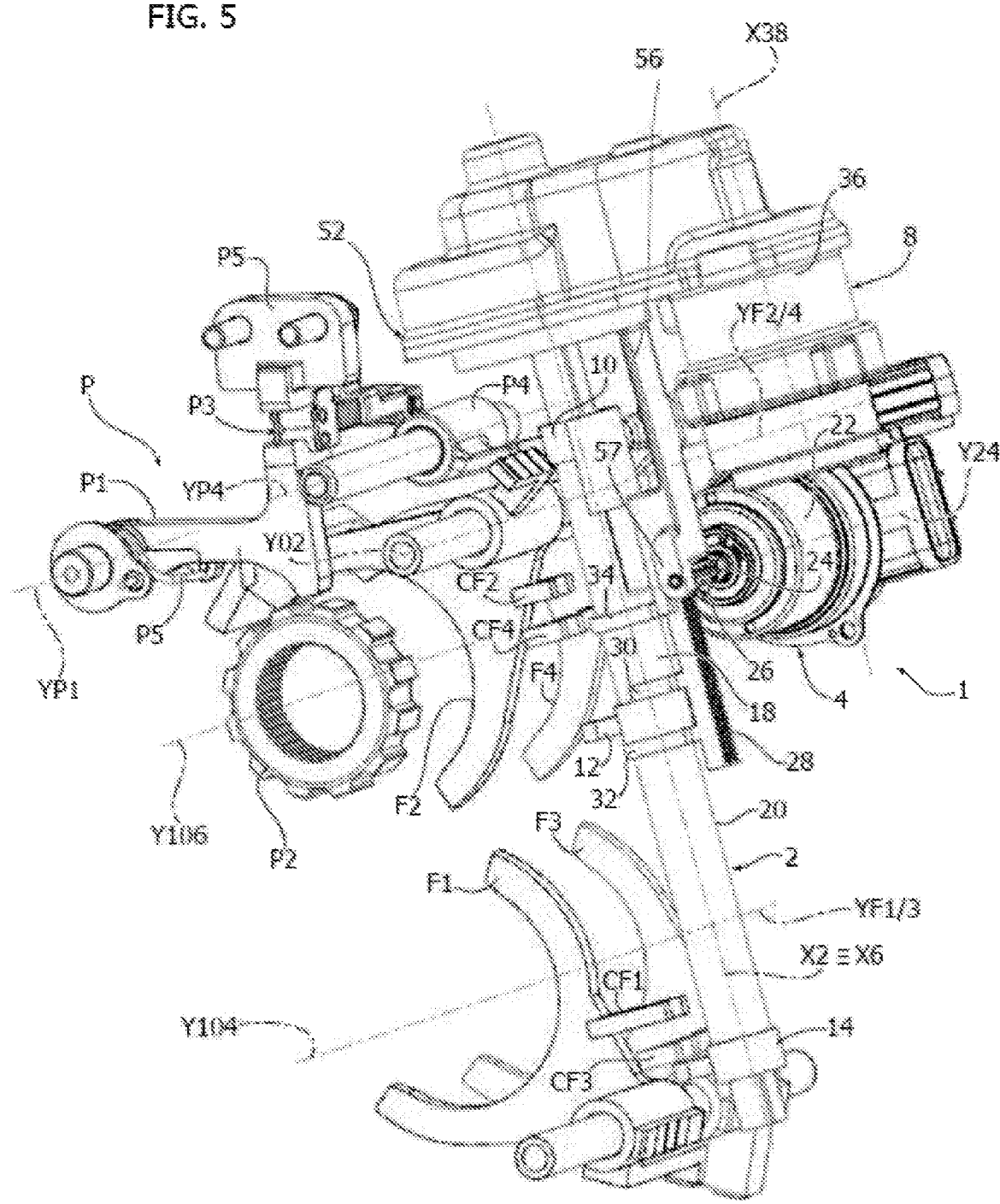
FIG. 5 is a detailed view of the functional coupling between the operating system according to the invention and the gearbox itself.

With reference to FIGS. 3 to 5, the forks F1 and F3 are slidable along a respective supporting rod R1/3, in particular along an axis YF1/3 thereof parallel to the axes of the primary and secondary shafts, whilst the forks F2 and F4 are slidable along a respective supporting rod R2/4, in particular along an axis YF2/4 thereof parallel to the axes of the primary and secondary shafts and parallel to the axis YF13.

As may be seen in FIG. 3, in FIG. 4 and, secondarily, in FIG. 5, the sets of forks F1, F3 and F2, F4 slide axially in parallel directions on opposite sides of the gearbox 100. Moreover visible in the representation of FIG. 3 are the control seats CF1-CF4, and in particular the distribution of the selection planes due to staggering of the seats CF1-CF4 in the direction of the axes X2 and X6.

As may be seen in FIG. 4, the operating system 1 is mounted on the gearbox 100 in such a way that the axes X2 and X6 are transverse (here orthogonal) with respect to the axes Y102, Y104, and Y106 of the primary and secondary shafts. An electrical machine 200 may moreover be coupled to the gearbox 100 for mild hybridization of the vehicle. The electrical machine 200 has an output shaft with a pinion that meshes with one of the gears carried by the primary shaft 102 by means of an idle ring gear 202.

Operation of the operating system 1 and of the gearbox 100 is described in what follows.

The shafts 2 and 6 perform, respectively, the functions of selection of the gears of the gearbox 100 and engagement of the gears themselves. The rotary actuator 22 is consequently a selection actuator, whereas the rotary actuator 36 is an engagement actuator.

The selection manoeuvre is provided by driving, by means of the actuator 22, the shaft 2 so that is performs an axial travel along the axes X2, X6. The pinion 26 meshes with the rack 28 causing an axial translation thereof along the axes X2, X6, and the same axial translation is transferred also to the shaft 2, which is fixed with respect to the rack itself and to the engagement elements 10, 12, 14, which translate with the shaft 2 thanks to the fact that the shape fit with the shaft 6 is axially slidable. The result of the selection manoeuvre is alignment—and hence coupling—of the radial finger 10F, 12F, 14F of one of the engagement elements 10, 12, 14 with a control seat CF1, Cf2, CF3, CF4 according to the gear to be engaged.

The engagement manoeuvre follows the selection manoeuvre and is provided by means of the actuator 36: the pinion 40 meshes with the toothing 44 of the (idle) gear wheel 42 and the toothing 46 of the gear wheel 42 meshes with the toothed sector 48, transmitting the rotary motion to the shaft 6 by means of the hub 50. The rotary motion of the shaft 6 results in a rotation of the engagement elements 10, 12, 14 (and of the shaft 2 itself) with consequent axial translation of the fork F1, F2, F3, F4 selected for engagement.

Unlike operating systems of a known type, the overall dimensions of the system 1 in the direction of the axes X2, X6 is markedly contained by the fact that the moving element that moves axially in the system 1 has an axial travel that is, at the most, equal to the ensemble of the selection planes. Moreover, the travel of selection does not result in drawing of the members responsible for the movement of engagement, given that the movements of selection and engagement are assigned to two separate shafts (2, 6) mobile relative to one another and driven independently.

It is hence possible to free the gearbox 100 from the need for the presence of large casings of control assemblies and/or the presence of particularly long operating systems that would not allow, for example, installation of the electrical machine 200.

It should moreover be noted—as may be seen in FIG. 4 and in FIG. 5—that it is possible to envisage that the engagement element 10 will carry out control of a parking device P of the gearbox 100. In the embodiment illustrated herein, the parking device P comprises a pawl P1 that rocks about an axis YP1 parallel to the axis Y106 and is elastically countered in rotation by means of a torsion spring PS.

The pawl P1 is configured for engagement with a sprocket P2, which is connected in rotation to the primary shaft 106. Engagement is provided by engaging the pawl P1 in the toothing of the sprocket P2, an operation achieved by means of a slider P3 controlled by a moving element P4, which is mobile along an axis YP4 parallel to the axis YP1 and can be driven via rotation of the engagement element 10.

The moving element P4 drives the slider P3, provided with rollers, which passes beyond the pawl P1, causing rotation thereof towards the toothing of the sprocket P2 by the cam effect. Basically, the slider P3 operates as a cam, while the pawl P1 operates as a tappet. The slider P3 is moreover fixed to a gearcase 100 by means of a fixing plate P5.

Of course, the details of construction and the embodiments may vary widely with respect to what has been described and illustrated herein, without thereby departing from the scope of the present invention as defined by the annexed claims.

The invention claimed is:

1. A system for operating a gearbox, comprising:
a first shaft having a first longitudinal axis;
a first actuator assembly operatively connected to the first shaft;
a second shaft having a second longitudinal axis;
a second actuator assembly operatively connected to the second shaft; and
a plurality of engagement elements connected in rotation to said second shaft;
wherein:
the first shaft is hollow, is fitted on said second shaft, and is axially movable relative to the second shaft;
said plurality of engagement elements are connected in translation to said first shaft and are axially movable therewith along said first longitudinal axis and relative to the second shaft;
the first actuator assembly is configured for imparting on said first shaft a movement of translation along the first longitudinal axis, said movement of translation being transferred to the plurality of engagement elements connected in translation to the first shaft; and
the second actuator assembly is configured for imparting on said second shaft a movement of rotation about the second longitudinal axis, said movement of rotation being transferred to said plurality of engagement elements, which are connected in rotation to the second shaft.

2. The operating system according to claim 1, wherein said second shaft is axially fixed.

3. The operating system according to claim 1, wherein each engagement element of the plurality of engagement elements is connected in rotation to said second shaft by means of a shape coupling of an axially sliding type.

4. The operating system according to claim 1, wherein said first actuator assembly comprises a first rotary actuator, a pinion connected in rotation to an output shaft of said first rotary actuator, and a rack with which said pinion meshes, said rack being coupled in translation to said first shaft.

5. The operating system according to claim 4, wherein said first shaft is freely rotatable with respect to said rack.

6. The operating system according to claim 4, wherein said second actuator assembly comprises a second rotary actuator, a transmission having an input element coupled to an output shaft of said second rotary actuator, and an output element connected in rotation to said second shaft, the transmission being configured for transmitting motion from said input element to said output element.

7. The operating system according to claim 6, wherein said second actuator assembly comprises a mounting flange, said mounting flange comprising a seat for housing said second rotary actuator, and a rotation support for the pinion of said first rotary actuator.

8. The operating system according to claim 6, wherein the input element of said transmission is a another pinion connected to the output shaft of said second rotary actuator, said another pinion meshing with a first toothing of an idle gear wheel having a first diameter, said idle gear wheel having a second toothing with a second diameter, smaller than the first diameter, said second toothing meshing with a toothed sector connected in rotation to said second shaft and defining said output element of the transmission.

9. The operating system according to claim 4, wherein each rotary actuator is an electric motor.

10. The operating system according to claim 1, wherein said first shaft comprises a plurality of segments coupled together via the plurality of engagement elements and connected in rotation thereto.

11. A gearbox comprising:
an operating system according to claim 1;
a primary shaft rotatable about a respective axis and comprising a first plurality of gear wheels connected in rotation thereto;
a first secondary shaft and a second secondary shaft rotatable about respective axes parallel to one another and to the respective axis of the primary shaft, the first and second secondary shafts comprising a second plurality and a third plurality of gear wheels, respectively, each of said second and third plurality of gear wheels meshing with a corresponding gear wheel of said first plurality of gear wheels of said primary shaft to define a plurality of forward gears of said gearbox and a reverse gear; and
the gear wheels of the second plurality and of the third plurality of gear wheels being mounted idle on the respective secondary shaft and being selectively coupleable in rotation to the respective secondary shaft by means of corresponding engagement devices, each of the engagement devices being controlled by means of a corresponding fork engagement device having a control seat configured for being selectively engaged by an engagement element of the plurality of engagement elements of said operating system;
wherein the first shaft and the second shaft of said operating system are arranged with an orientation transverse with respect to said primary shaft, said first secondary shaft, and said second secondary shaft.

12. The gearbox according to claim 11, further comprising a parking device comprising a pawl, which rocks about an axis parallel to the axis of the second secondary shaft and is countered elastically in rotation,
said pawl being configured for engagement with a sprocket, which is connected in rotation to the second secondary shaft, and being engageable in said sprocket via sliding of a slider, said slider being axially movable by being engaged by an engagement element of said plurality of engagement elements and being driven in rotation via said second shaft and a second motor-reducer assembly.

\* \* \* \* \*